(12) United States Patent
Ayre

(10) Patent No.: US 8,475,084 B2
(45) Date of Patent: Jul. 2, 2013

(54) TIDAL FLOW POWER GENERATION

(75) Inventor: Richard Ayre, Haverfordwest (GB)

(73) Assignee: Tidal Energy Limited, Monmouth (GB)

( * ) Notice: Subject to any disclaimer, the term of this patent is extended or adjusted under 35 U.S.C. 154(b) by 352 days.

(21) Appl. No.: 12/026,028

(22) Filed: Feb. 5, 2008

(65) Prior Publication Data

US 2009/0162144 A1  Jun. 25, 2009

(30) Foreign Application Priority Data

Dec. 21, 2007 (GB) .................................. 0724999.8

(51) Int. Cl.
*F03B 13/12* (2006.01)

(52) U.S. Cl.
USPC ................................ 405/208; 290/42; 290/53

(58) Field of Classification Search
USPC .................. 290/42, 43, 53, 54; 405/205, 207, 405/208, 200, 224
See application file for complete search history.

(56) References Cited

U.S. PATENT DOCUMENTS

| | | | | |
|---|---|---|---|---|
| 3,415,067 | A * | 12/1968 | Wolff | 405/207 |
| 4,026,587 | A | 5/1977 | Hultman et al. | |
| 4,112,863 | A * | 9/1978 | Nelson | 114/264 |
| 4,216,595 | A * | 8/1980 | Kato et al. | 37/195 |
| 4,538,849 | A * | 9/1985 | Khachaturian et al. | 294/81.1 |
| 5,909,060 | A * | 6/1999 | Gardner | 290/53 |
| 7,612,462 | B2 * | 11/2009 | Viterna | 290/53 |
| 2006/0261597 | A1 | 11/2006 | Gehring | |
| 2010/0183377 | A1 | 7/2010 | Fraenkel | |
| 2010/0239406 | A1 * | 9/2010 | Nicholls | 414/800 |

FOREIGN PATENT DOCUMENTS

| | | |
|---|---|---|
| CA | 2534555 | 2/2005 |
| DE | 1503349 A1 | 1/1970 |
| EP | 0708241 | 4/1996 |
| EP | 0924426 | 6/1999 |
| EP | 1467091 A1 * | 10/2004 |
| EP | 1467093 | 10/2004 |
| GB | 1524023 | 9/1978 |
| GB | 2344843 | 6/2000 |
| GB | 2365385 | 2/2002 |
| GB | 2365385 A * | 2/2002 |
| GB | 2431189 | 4/2007 |
| GB | 2434413 | 7/2007 |
| GB | 2436320 | 9/2007 |
| GB | 2437533 | 10/2007 |
| IE | 20040107 | 8/2005 |
| JP | 55007947 A * | 1/1980 |
| JP | 4070408 | 3/1992 |
| JP | 2006291780 | 10/2006 |
| WO | WO02070890 | 9/2002 |
| WO | WO2004/022968 | 3/2004 |
| WO | WO2004/085845 A | 10/2004 |

* cited by examiner

*Primary Examiner* — Sunil Singh
(74) *Attorney, Agent, or Firm* — Gordon & Jacobson, PC

(57) ABSTRACT

A structure for a tidal flow energy generation system is fabricated from tubular framework having tubular modules with mounts for respective tidal flow turbine nacelles. The node modules include tubular limbs extending in transverse directions and elongate tubes and provided to interconnect with the tube limbs of the node modules. The structure can be prefabricated and transported to a location for deployment. The structure can be deployed by means of hovering the assembled structure to the seabed, for example by means of flooding the structure.

20 Claims, 5 Drawing Sheets

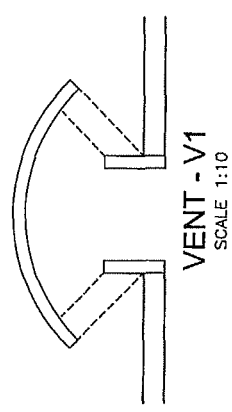
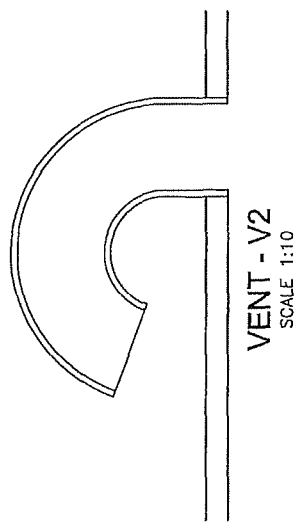
FIG 5

TIDAL FLOW POWER GENERATION

FIELD OF THE INVENTION

The present invention relates to tidal flow power generation.

BACKGROUND TO THE INVENTION

Various schemes have been proposed and utilised for tidal flow power generation. One of the major obstructions to successful utilisation of tidal flow power generation solutions is the difficulty of deployment of such systems on the seabed in the limited time between periods of high tidal current flow rates. Also there are technical problems in ensuring that the system is sufficiently securely anchored in place on the seabed, but quickly deployable and capable of being raised clear of the sea surface for maintenance.

DEFINITION OF THE INVENTION

According to a first aspect the present invention provides a structure for use in a tidal flow energy generation system, the structure comprising a tubular framework comprising:
 a plurality of tubular node modules having mounting means for mounting a respective tidal flow turbine nacelle, the respective node modules including tubular limbs extending in transverse directions; and,
 elongate tubes extending to interconnect with the tube limbs of the node modules.

According to a second aspect, the invention comprises a method of deploying a structure for use in a tidal flow energy generation system, the method comprising:
 Pre-fabricating the structure including a plurality of node modules having mounting means for mounting a respective tidal flow turbine nacelle, the respective node modules including limbs extending in transverse directions and, elongate structural elements extending to interconnect with the limbs of the node modules;
 transporting the prefabricated structure to a location for deployment;
 deploying the structure by means of lowering the assembled structure to the seabed.

PREFERRED FEATURES OF THE INVENTION

The tubular limbs of a respective node module preferably extend at an acute angle relative to one another.

In a preferred embodiment, the structure may be triangular in footprint having three node modules, each positioned at a respective vertex of the triangular footprint.

It is preferred that a respective node module is open to inflow of water through both ends of at least one of the tube limbs. A respective node module is desirably provided with a valve or baffle arrangement which in an open configuration permits fluid passage via the end of at least one of the tube limbs.

In one embodiment the node modules may carry respective ground engaging support elements. The ground engaging support elements may comprise self levelling devices for levelling the structure (such as hydraulic self levelling feet).

The mounting means for mounting a respective tidal flow turbine nacelle with a respective node module may comprise a receiving bore for receiving the shaft of a respective nacelle. In a preferred embodiment the mounting means for mounting a respective tidal flow turbine nacelle with a respective node module comprises a receiving bore for receiving the shaft of a respective nacelle, the receiving bore extending into the respective ground engaging support element.

Beneficially, a lifting line arrangement is connected to the structure and remains connected following deployment of the structure on the seabed. The lifting line arrangement is preferably connected at a plurality of the node modules. In a preferred embodiment the lifting line arrangement comprises a lifting bridle comprising a plurality of lifting line elements, and a lifting connection for connection to the hook of a crane; the bridle being connected to a locating line which extends away from the location of the structure to a fixed position.

The method may be well utilised wherein the node modules have tubular limbs and the elongate interconnecting elements comprise tubular elements connecting with the tubular limbs. In this case the deployment of the structure beneficially involves flooding substantially the entire interior of the tubular framework of the structure.

A weight bearing deployment/lifting line arrangement is preferably connected to the structure and remains connected following deployment of the structure on the seabed to be available for use in subsequently lifting the structure. A locating line may be connected to the deployment lifting line, which, following deployment of the structure on the seabed, extends away from the location of the structure to a fixed position.

The structure is beneficially deployed from the surface to the seabed with a respective turbine nacelle arrangement already received in position in a receiving structure of a respective node module.

The electrical cable connection to the respective turbine nacelle is preferably made prior to deployment from the surface to the seabed.

BRIEF DESCRIPTION OF THE DRAWINGS

The invention will be further described by way of example only and with reference to the accompanying drawings, in which:
FIG. 4a is an end elevation of FIG. 4;
FIG. 5 shows alternative embodiments of vent V1 and V2 in FIG. 4

DETAILED DESCRIPTION OF THE PREFERRED EMBODIMENTS

Figure 1:
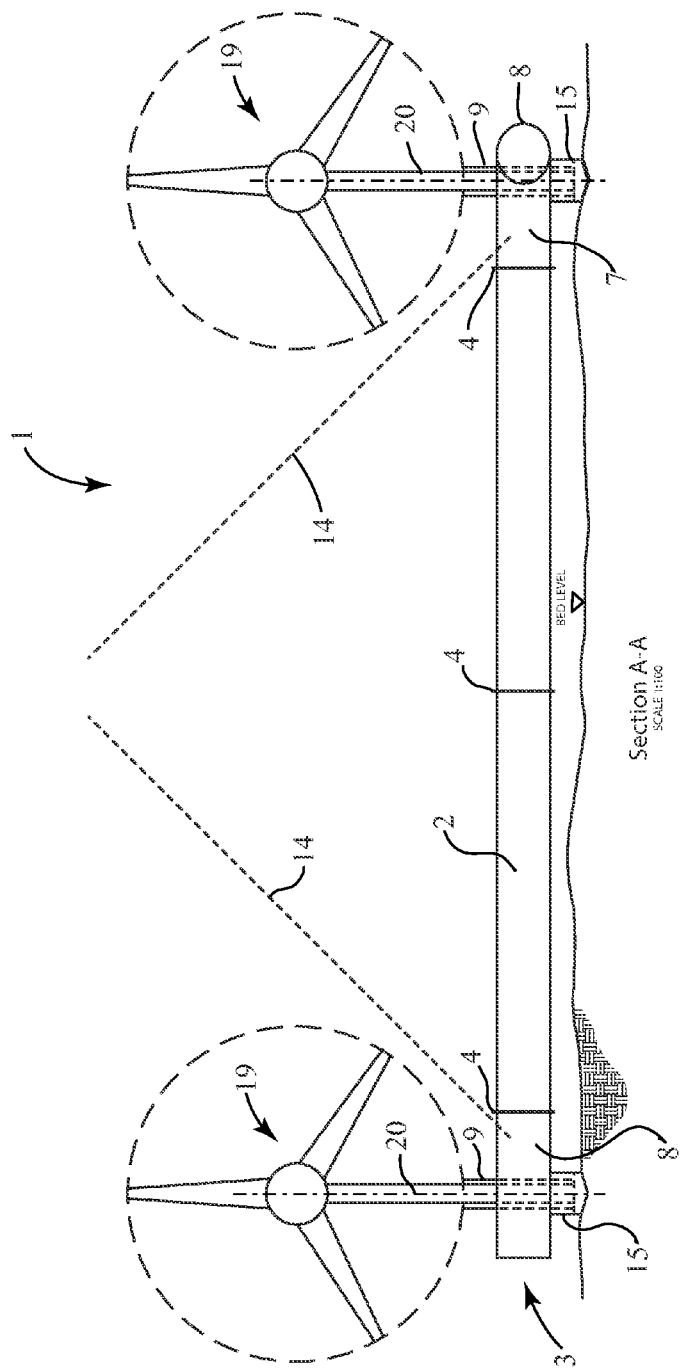
FIG. 1 is a schematic side view of a tidal generation structure mounted in position on the sea bed.

Referring to the drawings, there is shown a tidal flow energy generation arrangement 1. The tidal flow energy generation arrangement 1 is required to be deployed in extreme conditions. To be commercially competitive with other forms of power production areas of the seabed of high tidal flow energy concentration need to be utilised. These areas are difficult and dangerous to work in and the structure and its installation and retrieval need to take into account significant environmental hazards. The current flow, for example, is fast, typically upward of 4 Knots, and may be faster than a floating crane or anchors can hold. Areas are often in deep water, which may be deeper than those in which a piling rig can operate. Storm conditions can cause costly delays and postponement. Tidal reversal is twice a day and the time between tidal reversal may be very short (for example between 45 and 90 minutes). Additionally, in such high tidal flow areas, the seabed is scoured of sediment and other light material revealing an uneven rock seabed, which makes anchorage difficult. In the situations described it may be impossible for divers to operate on the structure when positioned on the seabed. Installation, recovery and service is therefore most conveniently carried out from the surface. To be environmentally acceptable, all parts of the structure and any equipment used in deployment or recovery must be shown to be recoverable.

Figure 3:
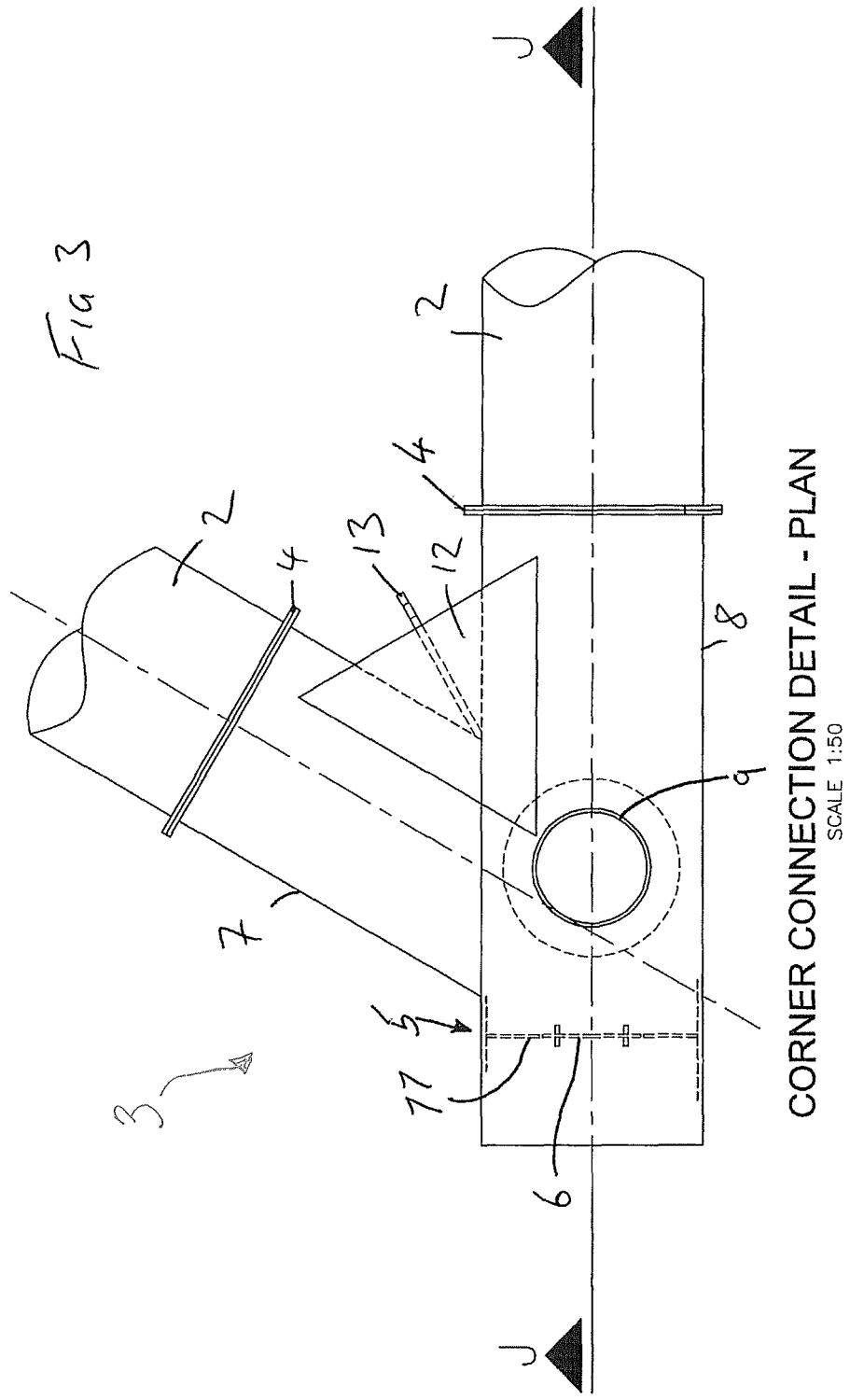
FIG. 3 is a schematic plan view of a corner module of the structure of FIGS. 1 and 2.

The arrangement 1 comprises a freestanding structural frame assembly comprising steel tubes 2 (circa 1.5 m diameter). The frame assembly comprises welded tubular steel corner modules 3 (as shown in detail in FIG. 3). The corner units are interconnected by lengths of the steel tubes 2. The structure as shown in the drawings is triangular in footprint and this may for certain deployment scenarios be preferred however other shape footprints (such as rectangular) are also envisaged in such arrangements the angular configuration of the corner modules 3 will of course be different to that shown and described in relation to the drawings.

The corner modules 3 comprise first and second angled limbs 7, 8 extending at an angle of 60 degrees to one another. The angled tube limb 7 is welded onto the outer cylindrical wall of limb 8. Angled tube limb 8 has an internal bore into which a nacelle locating tube 9 extends and is fixed. The corner module 3 and interconnecting tubes 2 include respective flanges 4 for bolting to one another. The tube limb 8 of the corner modules include a flap valve 5 comprising a hinged flap 6 closing an aperture in a baffle plate 11 (FIGS. 3, 4, 4*a*) welded internally of the end of tube limb 8. Water can flood into and flow out of the tube limb 8 (and therefore into the tubes 2) via the flap valve 5. Once flooded and in position on the seabed, the flap valve tends to close the end of the tube limb 8 preventing silting up internally of the tubular structure.

Figure 2:
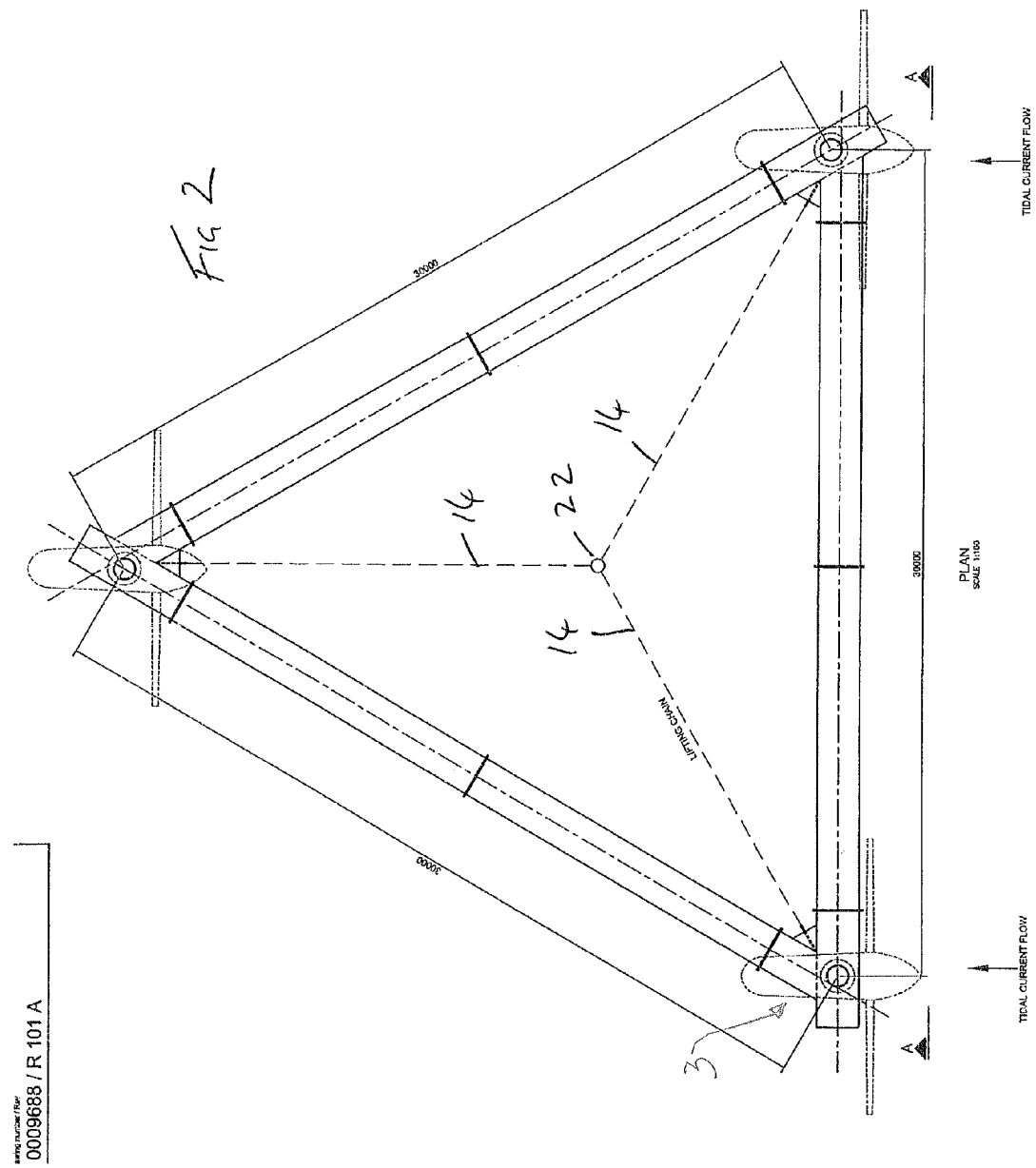
FIG. 2 is a schematic plan view of the structure of FIG. 1.

The corner modules 3 also include a structural steel plate 12 welded between the angled tubular limbs 7, 8. A lifting eye structure 13 is welded to the steel plate 12. As seen in FIG. 2, an end of a respective chain 14 of a chain lifting bridle arrangement is fixed to the lifting eye 13. A respective lifting chain 14 is attached at each node module 3, the distal ends meeting at a bridle top link 22. In use a crane hook (not shown) engages with the top link 22 for lifting. Self levelling hydraulic feet 15 (FIG. 1) are provided fore each of the corner modules 3. This ensures a level positioning of the structure on uneven scoured seabed and transfer of vertical loadings directly to the seabed.

The structure is held in position by its own mass and lack of buoyancy due to flooding of the tubes 2 and end modules 3. The tubes 2 are positioned in the boundary layer close to the seabed and the structure has a large base area relative to height. This minimises potential overturning moment. Horizontal drag is minimised due to using a single large diameter tubes 2 as the main interconnecting support for the frame.

Figure 4:
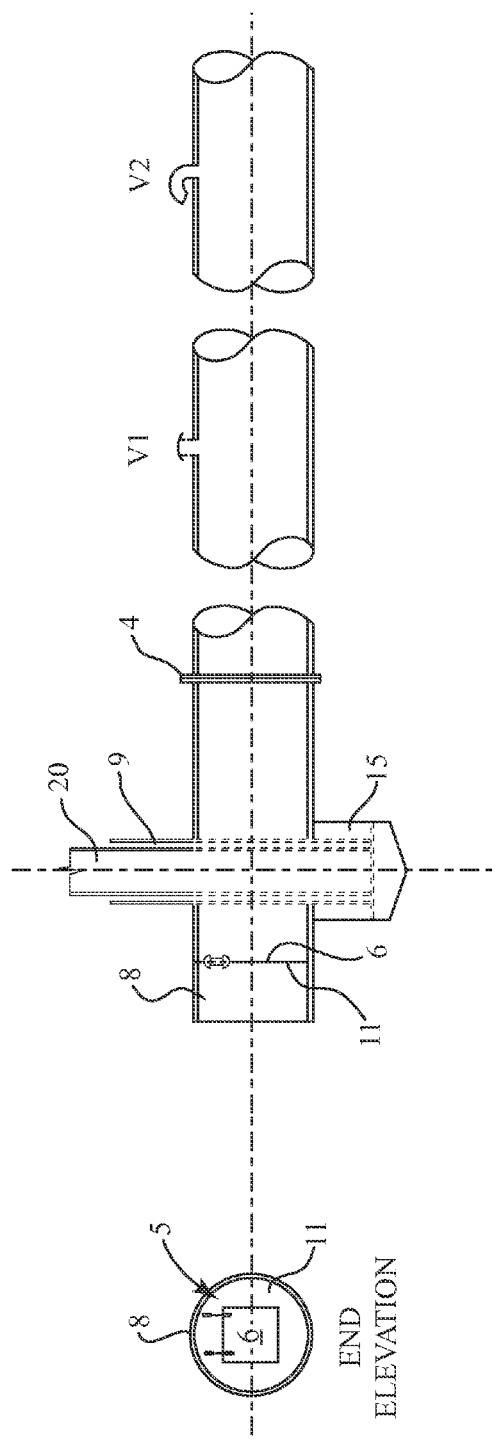
FIG. 4 is a sectional view along J-J

As seen in FIG. 4, the long tubes 2 are provided with vents V1, V2 to permit the interior of the structure to more effectively flood during deployment and drain when the structure is lifted clear of the surface of the water. The opening of the vent is either shrouded (V1) or downturned (V2) in order to prevent silt or other particulate matter entering into the tubular structure.

The structure forms a mounting base for the turbine nacelles 19 (FIG. 1) mounted at each corner module 3, the support shaft 20 of a respective nacelle being received within the respective mounting tube 3 such that the nacelles can rotate about the longitudinal axis of the respective support shaft 20. The turbine nacelles are controlled to re-orientate about the axis of shaft 20 in order to find the most advantageous facing direction to capture the tidal flow energy and thereby maximise effective operation. Power is transmitted from the corner mounted nacelles to onshore by means of appropriate cable as is well known in the marine renewables industry.

Areas of deep water and high current and low visibility are very hazardous for divers. The structure is designed to be installed and removed entirely from surface vessels. The structure is designed to be installed onto a previously surveyed site in the time interval that represents slack water between the ebb and flood of the tide. This time may vary from 45 to 90 minutes. The unit may be restricted from being deployed outside the timeframe as the drag on the structure from water movement could destabilise the surface vessel.

The site can be selected for energy density and relatively level site without further preparation. The structure is prefabricated as the corner modules 3 and the connecting tubes 2 and assembled on shore at the quayside. The structure is then shipped to the area for deployment. The structure is deployed by lowering the structure into the water and permitting the entire interior of the structure to flood with seawater. Thus the corner modules 3 and the interconnecting tubular frame members 2 flood during deployment. The vents V1 and V2 aid in this as air is able to be forced out. The corner modules flood through the flap valve 5. In retrieving the structure the whole structure drains quickly upon lifting to the water surface. The structure must be able to evacuate all air from inside the tubular structure very rapidly, to enable the unit to be lowered to the seabed inside the allowed time frame. Upon retrieval of the structure, as the structure approaches the surface a considerable volume of water will be entrained inside the structure. The water must be evacuated quickly to avoid potentially dangerous situation of the lifting apparatus being unable to lift the combined weight of the structure and water remaining inside the structure. In this situation, if the time limit was exceeded, the lifting apparatus would then be exposed to drag affecting the still submerged structure, which the lifting apparatus could not resist. This situation would also apply if sediment was allowed to enter the structure on the seabed. On retrieval the combined weight of the sediment and the structure may exceed the safe working load of the lifting apparatus. The flap valves 5 prevent ingress of sediment into the interior of the structure when positioned on the sea bed, but permit draining of the interior of the tubes 2 and node modules 3 when the structure is lifted (and also flooding when the structure is lowered).

An exemplary installation and retrieval procedure may run as follows:

Installation

1. All of the component parts (tubes 2, corner node modules 3) are completed at a point of manufacture remote from the assembly point.

2. A quay space with sufficient depth to enable the crane to reach the completed unit is chosen. The quay space has to be of sufficient bearing strength to enable the deployment of a suitable assembly crane. The components are delivered to the quay.

3. The tubular framework is assembled at the quay. The exemplary structure has 9 flanged joints, at 2 hours per joint (allow 2 days for assembly). The turbine support tubing 9 and turbine nacelle assembly 19 have 6 joints (allow 2 days for assembly). There are 9 blades to locate in the three turbine bosses, and ancillary electrical connections between the turbine assembly and the mainframe (allow 1 day).

4. On day 6 a floating crane arrives, attaches a chain lifting bridle to eyes 13 on the corner node modules 3 and lifts the whole assembly onto its deck. The crane also lifts onto the deck the coiled electric cable.

5. The crane steams to the deployment location, and meets a standby workboat.
6. The crane is positioned by its satellite system vertically over the chosen position of the final installation.
7. The work boat takes a stern line onto one of the corner node modules and stands off.
8. The crane attaches its main hook to the end of the riser from the main lifting bridle.
9. At the commencement of slack water neap the crane lifts the whole assembly and lowers it into the water.
10. The tubular framework immediately floods through the flap valves 5 at the ends of the respective tube limbs 8 at each node. The water quickly floods along the entire volume of the tubes 2.
11. The structure now has three attachments, the main lifting bridle, the stern line to the workboat, and the electric cable wound onto a drum on the deck of the tug.
12. The workboat moves gently away and holds the assembly in its chosen alignment relative to predicted tidal flow.
13. The crane lowers the unit, at a winding rate of perhaps 0.5 m sec, as it approaches the seabed it slows (allow 5 minutes for decent).
14. As the structure descends the workboat keeps slight tension in the alignment cable.
15. The structure is now on the seabed, the workboat fires and explosive bolt to detach itself from the corner unit. The workboat comes alongside the crane. The crane brings its hook and the end of the chain lifting bridle onto the deck of the crane.
16. The workboat attaches its stern line to the top link of the lifting bridle.
17. The crane is held on station by its satellite system immediate above the centre of the unit on the seabed. The lifting bridle is lowered to the seabed in the centre of the unit.
18. The workboat pays out stern line cable to the bridle as it descends.
19. The drum power cable from the unit is transferred to the workboat.
20. The workboat steams away paying out power cable and stern line cable clamped together.
21. The cables are payed out from the workboat to a retrievable position. This might be a buoy in slacker water, or ashore.

Retrieval
1. It is to be decided if the unit to be removed completely, or lifted to the surface for service. If it is for service then the electric power output cable can be left in place. If not then all the cable needs to be removed.
2. The workboat moves to the point at the end of the steel cable where it can be retrieved.
3. The cable is shackled to a winding drum on the workboat and passed over the bow roller of the workboat.
4. The workboat winds the drum and follows the cable run.
5. As the electric cable rises to the surface with the main cable it is allowed to run over the bow roller and then separated from the main cable and coiled or would onto a separate drum.
6. The workboat keeps winding until the top link of the lifting bridle breaks the surface.
7. As slack water neaps approaches the workboat attaches the top link of the lifting bridle to the hook if the crane, and detaches the cable.
8. The drum of power cable is passed over to the crane.
9. As soon as the current allows the crane begins winding and lifts the unit to the surface.
10. At the surface the flooded tube sections immediately drain off allowing the unit to clear the water and to be held in air.
11. The unit is washed clear of debris and lowered onto the deck of the crane.
12. The crane returns the unit to storage.

Specific advantages of the arrangement described are:
The support structure is of sufficient strength to resist the loading imposed by a number of operating turbines.

The structure is held in position by its own weight onto an unprepared seabed.

The structure can be installed in slack water between tides.

The structure is modular. It is designed to be fabricated in a remote facility transported by road to a quayside where it can be rapidly assembled.

The structure can evacuate both air and water rapidly, during installation and recovery.

The structure has the ability to resist the ingress of sediment over long operating periods submerged in flowing water.

The invention claimed is:

1. A structure that is deployed on a seabed for use in a tidal flow energy generation system that includes three tidal flow turbine nacelles, the structure comprising:
    three node modules each including a pair of limbs; and
    elongate members extending to interconnect with the limbs of the three node modules;
    wherein the pair of limbs of a respective node module extend at an acute angle relative to one another such that the three node modules are arranged in a triangular footprint with the three node modules positioned at respective vertices of the triangular footprint, and wherein the three node modules and the interconnecting members of the structure are configured to rest on or closely adjacent the seabed;
    wherein the three node modules each include a respective mounting structure and a shaft, wherein the shaft is received by the mounting structure and extends upward above the mounting structure, the shaft for supporting a corresponding one of the three tidal flow turbine nacelles above the level of the node modules and interconnecting members such that the three tidal flow turbine nacelles are operably disposed above the level of the node modules and interconnecting members, wherein the shaft extends along a first axial direction that intersects the corresponding tidal flow turbine nacelle; and
    wherein the three node modules each include a respective ground engaging element for transferring vertical loading to the seabed, the respective ground engaging element extending downward along a second axial direction to a tapered distal end for contacting the seabed.

2. A structure according to claim 1, wherein:
    the respective ground engaging element is aligned with the respective mounting structure such that the first axial direction is aligned with the second axial direction.

3. A structure according to claim 1, wherein:
    the interconnecting members of the structure are tubular in form.

4. A structure according to claim 3, wherein:
    the tubular form interconnecting members are configured to allow for inflow of seawater for flooding the tubular form interconnecting members during use.

5. A structure according to claim 4, wherein:
    the three node modules each include a respective valve with an open configuration that permits inflow of seawater for flooding the tubular form interconnecting members of the structure.

6. A structure according to claim 5, wherein:
    the respective valve has a closed configuration that prevents silt from entering the three node modules and the tubular form interconnecting tubes of the structure.

7. A structure according to claim 1, wherein:
    the respective ground engaging element comprises a device for leveling the structure.

8. A structure according to claim 1, wherein:
the respective mounting structure further comprises a receiving bore for receiving the shaft.

9. A structure according to claim 1, further comprising:
a lifting line arrangement connected to the structure and remaining connected following deployment of the structure on the seabed.

10. A structure according to claim 9, wherein:
the lifting line arrangement is connected at a plurality of the three node modules.

11. A structure according to claim 9, wherein:
the lifting line arrangement comprises a lifting bridle comprising a plurality of lifting line elements, and a lifting connection for connection to the hook of a crane; the bridle being connected to a locating line which extends away from the location of the structure to a fixed position.

12. A structure according to claim 1, wherein:
the shaft for each respective node module is longer in length than the ground engaging element for the respective node module.

13. A tidal flow energy generation system that is deployed on a seabed, the system comprising:
three tidal flow turbine nacelles;
three node modules each including a pair of limbs; and
elongate members extending to interconnect with the limbs of the three node modules;
wherein the pair of limbs of a respective node module extend at an acute angle relative to one another such that the three node modules are arranged in a triangular footprint with the three node modules positioned at respective vertices of the triangular footprint, and wherein the three node modules and the interconnecting members of the structure are configured to rest on or closely adjacent the seabed;
wherein the three node modules each a respective mounting structure and a shaft, wherein the shaft is received by the mounting structure and extends upward above the mounting structure, the shaft for supporting a corresponding one of the three tidal flow turbine nacelles above the level of the node modules and interconnecting members such that the three tidal flow turbine nacelles are operably disposed above the level of the node modules and interconnecting members, wherein the shaft extends along a first axial direction that intersects the corresponding tidal flow turbine nacelle; and
wherein the three node modules each include a respective ground engaging element for transferring vertical loading to the seabed, the respective ground engaging element extending downward along a second axial direction to a tapered distal end for contacting the seabed.

14. A system according to claim 13, wherein:
the respective ground engaging element is aligned with the respective mounting structure such that the first axial direction is aligned with the second axial direction.

15. A system according to claim 13, wherein:
the interconnecting members of the structure are tubular in form.

16. A system according to claim 15, wherein:
the tubular form interconnecting members are configured to allow for inflow of seawater for flooding the tubular form interconnecting members during use.

17. A system according to claim 16, wherein:
the three node modules each include a respective valve with an open configuration that permits inflow of seawater for flooding the tubular form interconnecting members of the structure.

18. A system according to claim 17, wherein:
the respective valve has a closed configuration that prevents silt from entering the three node modules and the tubular form interconnecting tubes of the structure.

19. A system according to claim 13, wherein:
the three tidal flow turbine nacelles are configured to re-orientate about the first axial directions of the corresponding shafts of the three node modules of the system.

20. A system according to claim 13, wherein:
the shaft for each respective node module is longer in length than the ground engaging element for the respective node module.

* * * * *